United States Patent [19]
Granovski

[11] Patent Number: 5,964,240
[45] Date of Patent: Oct. 12, 1999

[54] PIPE TAPPING

[75] Inventor: Yuri Granovski, Haifa, Israel

[73] Assignee: Pressurised Pipe Connectors LTD, Katzrin, Israel

[21] Appl. No.: 09/151,941

[22] Filed: Sep. 11, 1998

[51] Int. Cl.⁶ .................................................. F16K 43/00
[52] U.S. Cl. ............................ 137/15; 137/318; 408/67; 408/87; 408/112
[58] Field of Search ......................... 137/318, 15; 30/92, 30/92.5, 93, 94, 95, 96; 285/197; 408/67, 68, 87, 92, 97, 112

[56] References Cited

U.S. PATENT DOCUMENTS

| | | | |
|---|---|---|---|
| 396,177 | 1/1889 | Smith | 137/318 |
| 455,890 | 7/1891 | Smith | 137/318 |
| 527,877 | 10/1894 | O'Neil | 137/318 |
| 2,763,282 | 9/1956 | Reedy | 137/318 |
| 2,964,290 | 12/1960 | Mueller | 137/318 |
| 3,428,075 | 2/1969 | Wagner | 137/318 |
| 3,650,547 | 3/1972 | Tickett | 137/318 |
| 3,652,107 | 3/1972 | Tickett | 137/318 |
| 3,703,906 | 11/1972 | Tickett | 137/318 |
| 3,735,775 | 5/1973 | Tickett | 137/318 |
| 3,974,846 | 8/1976 | Serota | 137/318 |
| 4,018,246 | 4/1977 | Langstroth | 137/318 |
| 4,216,793 | 8/1980 | Volgstadt et al. | 137/318 |
| 4,516,598 | 5/1985 | Stupak | 137/318 |
| 4,611,624 | 9/1986 | Snyder | 137/318 |
| 4,761,024 | 8/1988 | Ewen | 137/318 |
| 4,776,362 | 10/1988 | Domingue, Sr. et al. | 137/318 |

FOREIGN PATENT DOCUMENTS

| | | | |
|---|---|---|---|
| 140850 | 6/1953 | Sweden | 137/318 |
| 2039656 | 8/1980 | United Kingdom | 137/318 |

*Primary Examiner*—George L. Walton
*Attorney, Agent, or Firm*—Davidson, Davidson & Kappel, LLC

[57] ABSTRACT

A pipe tapping device which includes a valve conduit having a longitudinal axis, a fluid inlet portion and a fluid outlet portion, wherein the fluid inlet portion has associated therewith, a cutting edge; mounting apparatus for mounting the valve conduit onto a pipe to be tapped; and compression apparatus for bringing the cutting edge into compressive contact with an outer surface of the pipe prior to tapping of the pipe; wherein the valve conduit is selectably rotatable about the longitudinal axis, such that upon bringing the cutting edge into the compressive contact with an outer surface of the pipe, rotation of the valve conduit is operative to transfer a turning force to the cutting edge so as to cause the cutting edge to cut a preselected portion of the pipe wall, thereby to form a coupon.

29 Claims, 8 Drawing Sheets

PIPE TAPPING

FIELD OF THE INVENTION

The present invention relates to pipe tapping apparatus used for attaching branch fittings to pipelines—including pipelines used for transporting pressurized or high temperature substances—without disrupting the flow therethrough.

BACKGROUND OF THE INVENTION

Pipe tapping devices are commonly recognized for the important role which they play in overcoming the need to shut down the operation of pipeline systems in order to join or repair branch fittings. Although the individual design of pipe tapping apparatus may differ amongst various devices disclosed by prior known art, the common function of such apparatus is to allow for the joining of new branch fittings without disruption to the through-flow of fluid in the main pipe.

Some disadvantages which are commonly presented by known pipe tapping devices include:

i) large dimensions and complexity of the apparatus used, which in turn, often result in increased production costs;

ii) difficulties associated with overcoming resistive forces where a large area of pipe wall is sought to be tapped;

iii) difficulties associated with tapping thick pipe walls, or pipes made of very hard materials;

iv) the time taken to install and remove pipe tapping apparatus;

v) the long-term stability of the branch fitting tapped into a pipe, especially around the joint between the branch fitting and the main pipe;

vi) difficulties associated with removal of the 'coupon' or 'slug' portion cut from the pipe.

An indication of the state of the art is provided by European Patent Application EP 0,754,900 A1, entitled "Tapping Fitting", which discloses a tapping tee fitting for application to a pipe in order to tap a fluid conducted therethrough to an ancillary device. The tapping fitting includes a housing having a rotatable blade assembly which is threadedly received within the housing main section, and includes a cylindrical cutting blade at its inner end which may be employed to cut a cylindrical slug from the pipe. The device further includes a hollow stem secured to the rotatable assembly. An outlet section is positioned generally transversely to the housing main section so that it rests generally above and perpendicular to the area of the pipe which is sought to be tapped. In operation, a key is used to rotate the hollow stem and blade assembly from an initial retracted position to a projected position which represents completion of the cutting operation. Thereafter, the cutter blade assembly is rotated in the opposite direction within the hollow stem so as to retract the cutter assembly from its engagement with the pipe. The key may then be removed and the hollow stem is detached so as to leave the cutter assembly retained in the housing main section.

Whilst the above device describes a comprehensive tapping fitting for use in tapping a fluid through to an ancillary device, the threaded nature of the rotatable blade assembly and the cylindrical cutting blade, would appear to compound the resistive forces which arise during the cutting process, thereby limiting the usefulness of the device in respect of pipes which feature large diameters, thick pipe walls, and/or materials difficult to penetrate.

SUMMARY OF THE INVENTION

It is an aim of the present invention to provide a pipe tapping device for attaching branch fittings to pipelines, including pipelines in operation, which overcomes disadvantages of known art.

There is thus provided, in accordance with a preferred embodiment of the invention, a pipe tapping device which includes:

a valve conduit having a longitudinal axis, a fluid inlet portion and a fluid outlet portion, wherein the fluid inlet portion has associated therewith, a cutting edge;

mounting apparatus for mounting the valve conduit onto a pipe to be tapped; and compression apparatus for bringing the cutting edge into compressive contact with an outer surface of the pipe prior to tapping of the pipe;

wherein the valve conduit is selectably rotatable about the longitudinal axis, such that upon bringing the cutting edge into the compressive contact with an outer surface of the pipe, rotation of the valve conduit is operative to transfer a turning force to the cutting edge so as to cause the cutting edge to cut a preselected portion of the pipe wall, thereby to form a coupon.

Additionally, in accordance with a preferred embodiment of the present invention, there is also included apparatus for extracting the coupon from the pipe wall.

Further, in accordance with a preferred embodiment of the present invention, the compression apparatus also includes a rotatable compression element mounted for rotation about the valve conduit.

Preferably, in accordance with a preferred embodiment of the present invention, the compression element is mounted onto at least a portion of the mounting apparatus extending transversely to the pipe wall, and arranged for selectable rotation about the portion of the mounting apparatus so as to axially translate therealong when rotated.

Additionally, in accordance with a preferred embodiment of the present invention, the compression apparatus also includes a compressive resilient element, arranged between the compression element and a predetermined support portion of the valve conduit, and the compression element is operable to be rotated in a predetermined direction about the longitudinal axis so as to compress the resilient element.

Further, in accordance with a preferred embodiment of the present invention, compression of the resilient element causes transfer of an axial force to the cutting edge via the support portion of the valve conduit, so as to cause the cutting edge to bear on the pipe wall.

Additionally, in accordance with a preferred embodiment of the present invention, the apparatus for extracting the coupon from the pipe wall includes apparatus for retracting the coupon through the valve conduit to the outlet portion.

Further, in accordance with a preferred embodiment of the present invention, the apparatus for retracting the coupon through the valve conduit to the outlet portion includes a gripping device having a gripping rod axially extending through the valve conduit, wherein the gripping rod is preferably selectably rotatable and includes an end bit for threaded engagement with the preselected portion of the pipe wall from which the coupon is to be formed.

Additionally, in accordance with a preferred embodiment of the present invention, the gripping device and the compression apparatus cooperate to bring the end bit into compressive contact with an outer surface of the pipe.

Further, in accordance with a preferred embodiment of the present invention, there is also included apparatus for selectably closing the fluid outlet portion to through-flow which preferably includes a valve mechanism.

Additionally, in accordance with a preferred embodiment of the present invention, there are also included one or more sealing elements for sealing between the fluid inlet portion of the valve conduit and the mounting apparatus, one or more sealing elements for sealing between the mounting apparatus and the pipe, and one or more sealing elements for sealing the fluid outlet portion of the valve conduit.

Further, in accordance with a preferred embodiment of the present invention, the outlet portion of the valve conduit is configured for attachment of a branch member thereto.

There is also provided in accordance with an additional preferred embodiment of the invention, a method of tapping a pipe which includes the following steps:

mounting onto a pipe to be tapped a valve conduit having a longitudinal axis, a fluid inlet, a fluid outlet, and a cutting edge associated with the inlet, wherein the cutting edge is arranged adjacent to the pipe;

compressing a compressive resilient element so as to cause the cutting edge to bear onto a portion of a wall of the pipe sought to be tapped; and rotating at least the valve conduit about the longitudinal axis, so as to cause a rotation of the cutting edge relative to the pipe, thereby causing the cutting edge to cut through the pipe wall so as to form a coupon.

Further, in accordance with the additional preferred embodiment of the present invention, the method also includes the following additional steps:

prior to formation of the coupon, gripping the portion of the pipe wall from which the coupon is formed, and removing the coupon from the pipe.

Additionally, in accordance with the additional preferred embodiment of the present invention, the step of removing the coupon from the pipe includes the step of extracting the coupon through the valve conduit.

Optionally, in accordance with the additional preferred embodiment of the present invention, the steps of compressing the compressive resilient element and rotating at least the valve conduit about the longitudinal axis, are alternatingly repeated until the cutting edge cuts through the entire thickness of the pipe wall.

Further, in accordance with the additional preferred embodiment of the present invention, the step of gripping includes the following sub-steps:

positioning a threaded gripping element adjacent to the portion of the pipe wall from which the coupon is formed;

compressing the compressive resilient element so as to cause the threaded gripping element to bear onto the portion of pipe wall; and rotating the threaded gripping element thereby causing the threaded gripping element to threadedly engage the portion of the pipe wall.

Optionally, in accordance with the additional preferred embodiment of the present invention, the sub-steps of compressing the compressive resilient element and rotating the threaded gripping element, are alternatingly repeated until such time as the threaded gripping element engages the portion of the pipe wall to at least a desired depth.

Additionally, in accordance with the additional preferred embodiment of the present invention, the method also includes the step of closing the fluid outlet to through-flow of fluid prior to cutting through the pipe wall.

BRIEF DESCRIPTION OF THE DRAWINGS

The present invention will be more fully understood and appreciated from the following detailed description, taken in conjunction with the drawings, in which:

FIGS. 1A and 1B are respective enlarged views of details A and B in FIG. 1;

FIG. 3A is an enlarged view of detail A in FIG. 3;

DETAILED DESCRIPTION OF THE INVENTION

Figure 1:
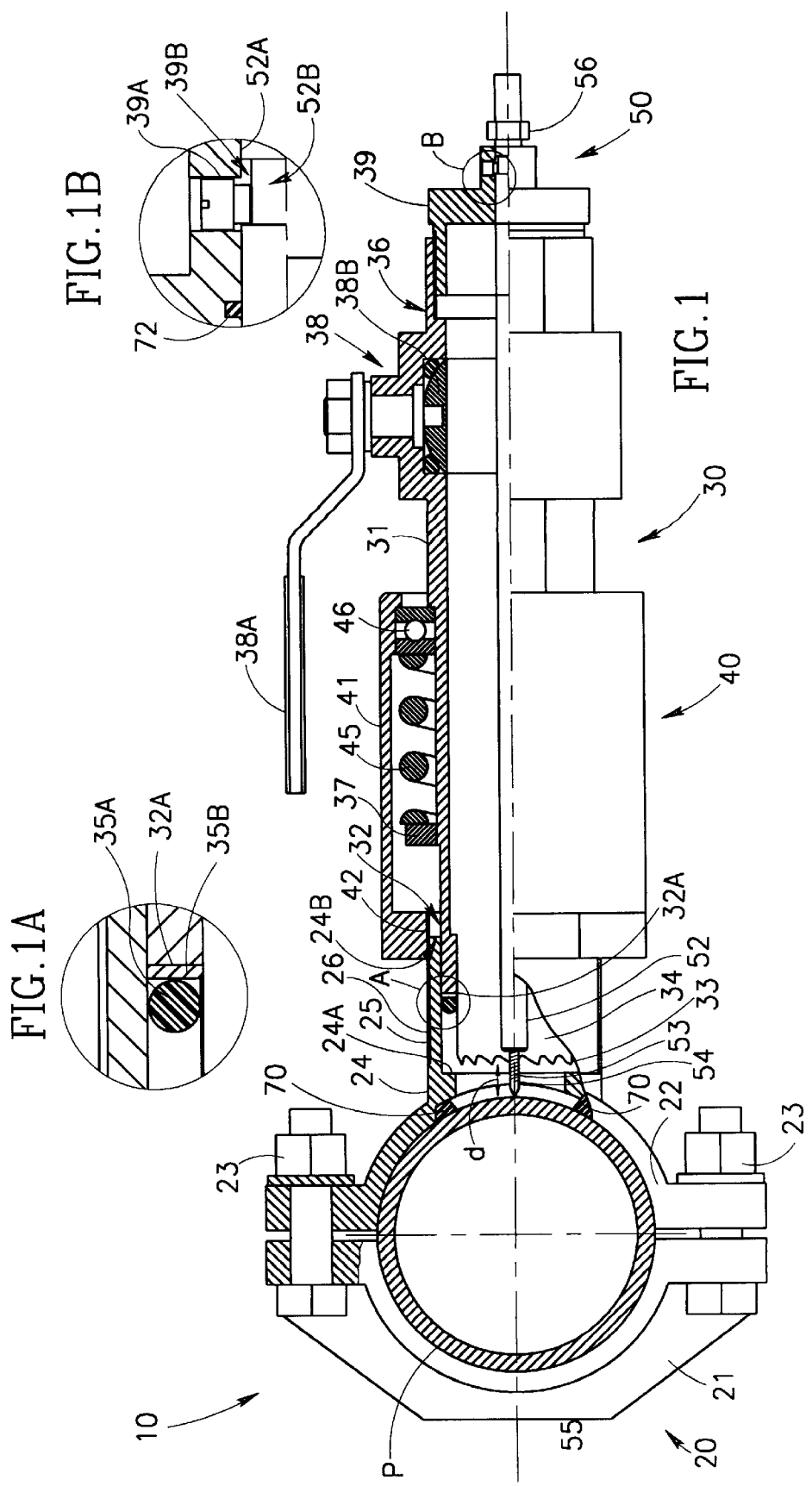
FIG. 1 is a partially cut-away side view of a pipe tapping device constructed in accordance with a preferred embodiment of the present invention and connected to a pipe.
Figure 2:
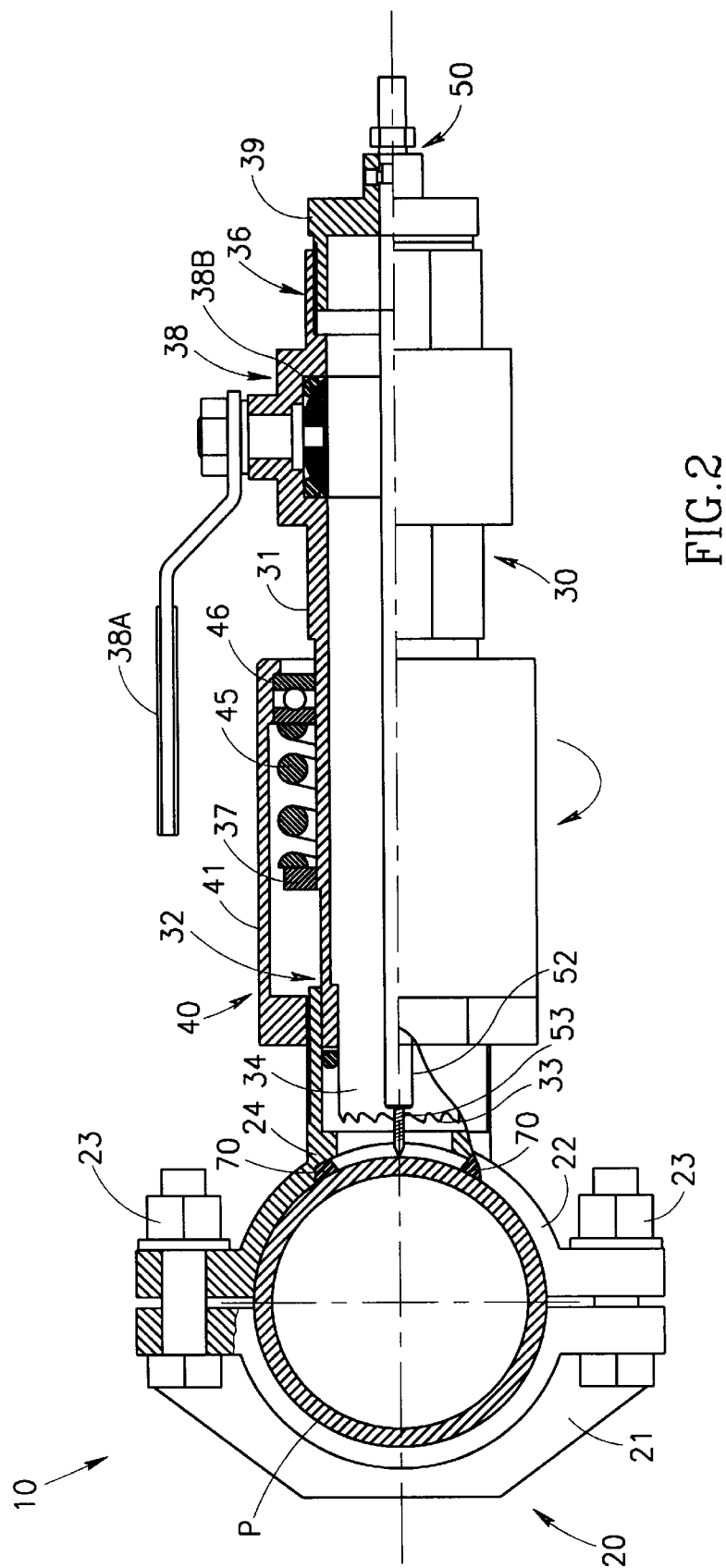
FIG. 2 is a partially cut-away side view similar to that of FIG. 1, depicting operation of the device's compression apparatus prior to operation of the gripping device.
Figure 3:
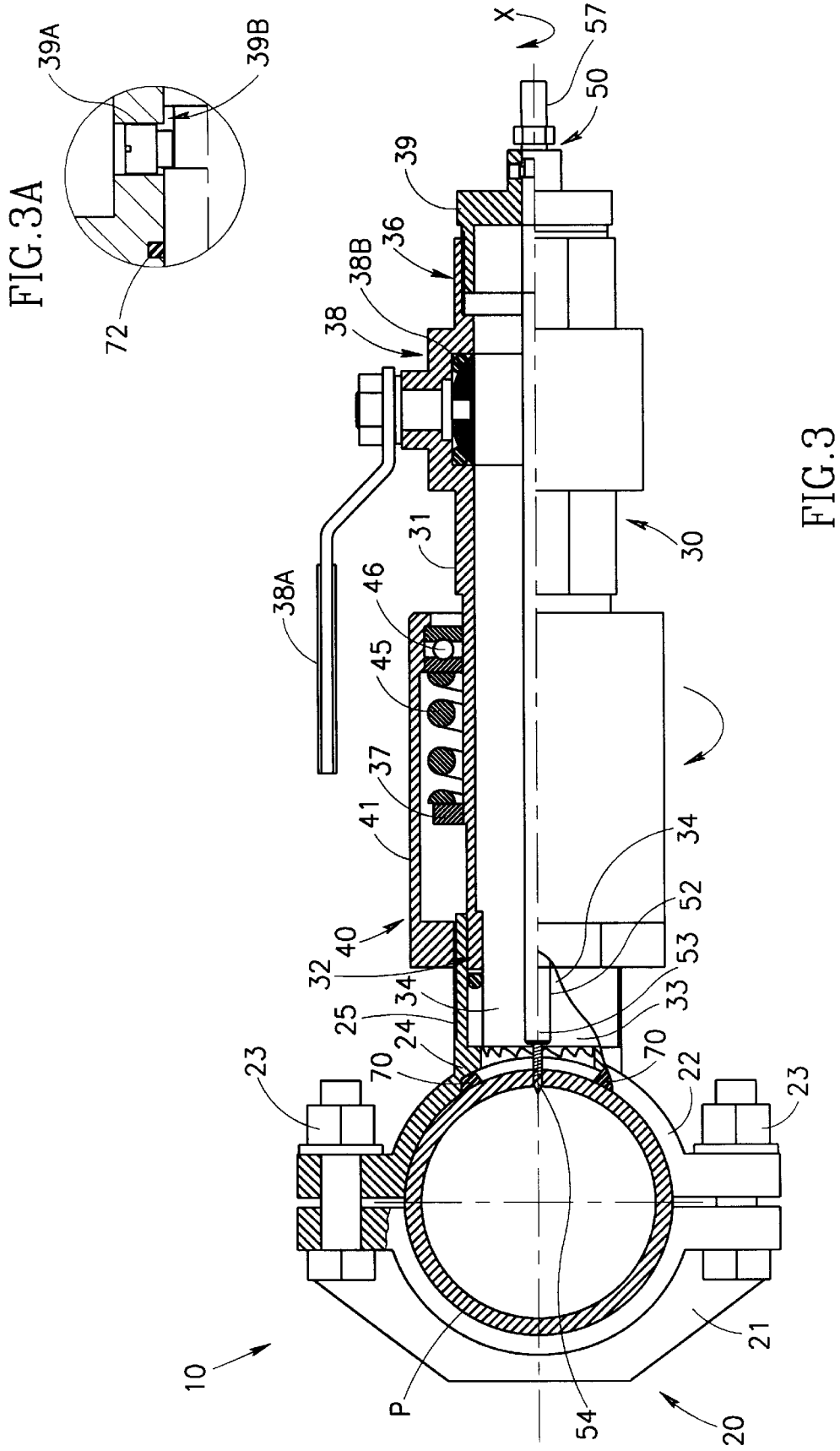
FIG. 3 is a partially cut-away side view similar to that of FIGS. 1 and 2, but wherein the device's gripping device has penetrated the wall of the pipe so as to grip a portion thereof.
Figure 4:
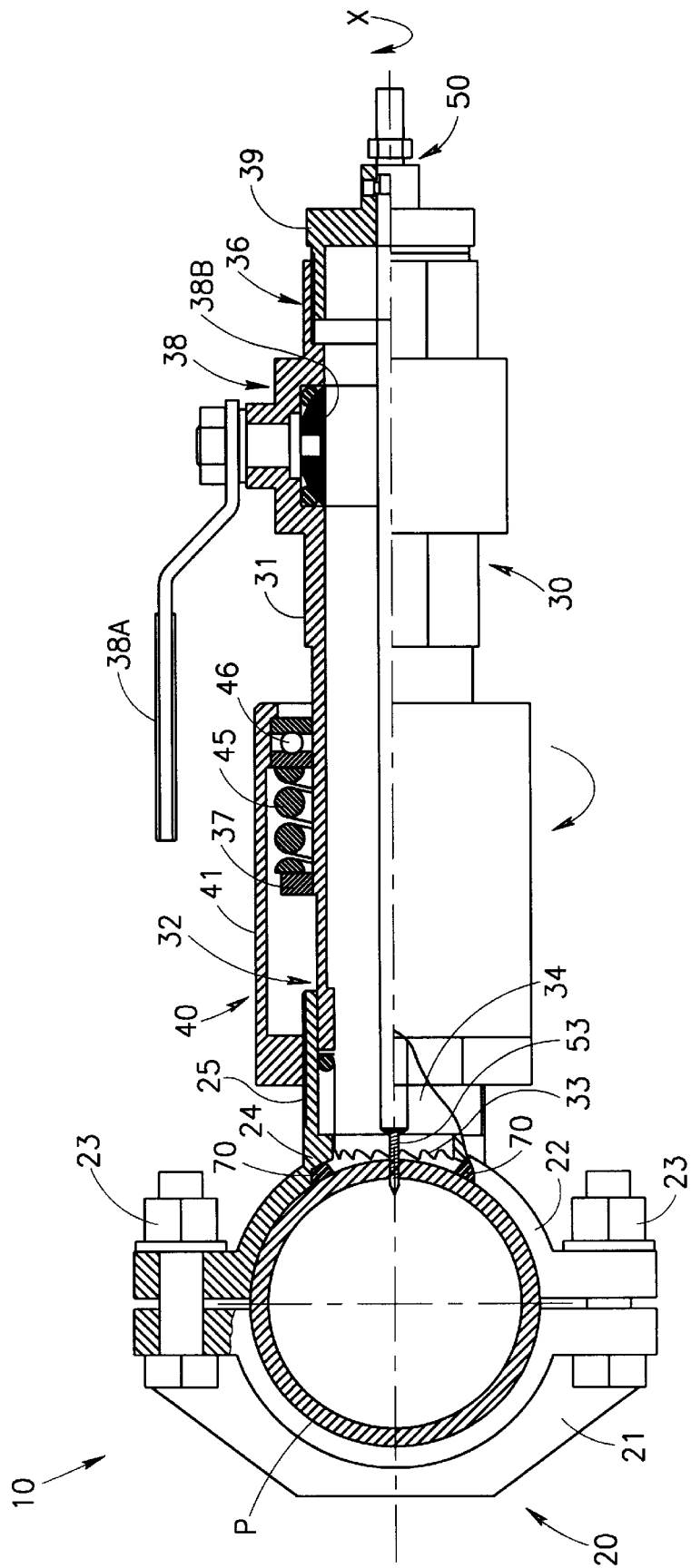
FIG. 4 is a partially cut-away side view similar to that of FIG. 3, depicting operation of the device's compression apparatus prior to cutting a portion of the pipe.

The present invention relates to the provision of pipe tapping apparatus which may be used for example, to attach a branch device to a main pipeline without disconnecting or interrupting the flow through the main pipeline. The apparatus may be utilized for tapping a variety of pipelines, including pipelines which carry pressurized gas or liquid materials.

By way of non-limiting example, the apparatus may be used for connecting branch members to an existing pipeline. Alternatively, the apparatus may be used to attach by-pass pipeline branches to a main pipeline, so as to make possible the reconditioning or repair of a section of the main pipeline without interrupting the use thereof. Similarly, the present invention may be employed to insert an outlet channel or outlet tap into a pipeline for use in connecting removable appliances, such as pipeline testing devices.

Whilst the description set out hereinbelow describes a pipe tapping device which is constructed for use in tapping pipelines in operation, the present invention is also intended to be adaptable for use in repeated hole drilling of pipes not under pressure at the time of tappping.

Referring generally to FIGS. 1–6, there is seen a pipe tapping device, referenced 10, constructed and arranged in accordance with a preferred embodiment of the invention, and attached to a pipe P. Typically, pipe tapping device 10 includes four main components, namely: a mounting 20, a tapping valve 30, compression apparatus 40, and apparatus for extracting a detached portion of pipe shown in FIGS. 5 and 6 as coupon, C, once it has been cut from a pipe wall. Such apparatus may be exemplified by a gripping device, referenced 50.

Referring now to FIG. 1 in more detail, mounting 20 of pipe tapping device 10 is seen to be typically formed of two rigid complimentary mounting portions 21 and 22, each mounting portion being configured for placement around a semi-cylindrical, outer surface portion of pipe P as illustrated. Once mounted onto pipe P, mounting portions 21 and 22 are held together by suitable fastening elements 23 which may take the form of threaded securing bolts as illustrated, or other mechanical securing apparatus such as fastening clamps and the like (not shown).

Integrally formed with mounting portion 22 of mounting 20, is a cylindrical connector 24 which is oriented generally transverse to pipe P. Preferably, connector 24 has formed thereon, an outward-facing thread 25 along at least a portion of its outer surface 26. Connector 24 is further formed so as to receive therein, a conduit portion of valve 30, hereinafter referenced valve conduit 31. Typically, valve conduit 31 is formed of any suitable metal or rigid plastic.

Figure 5:
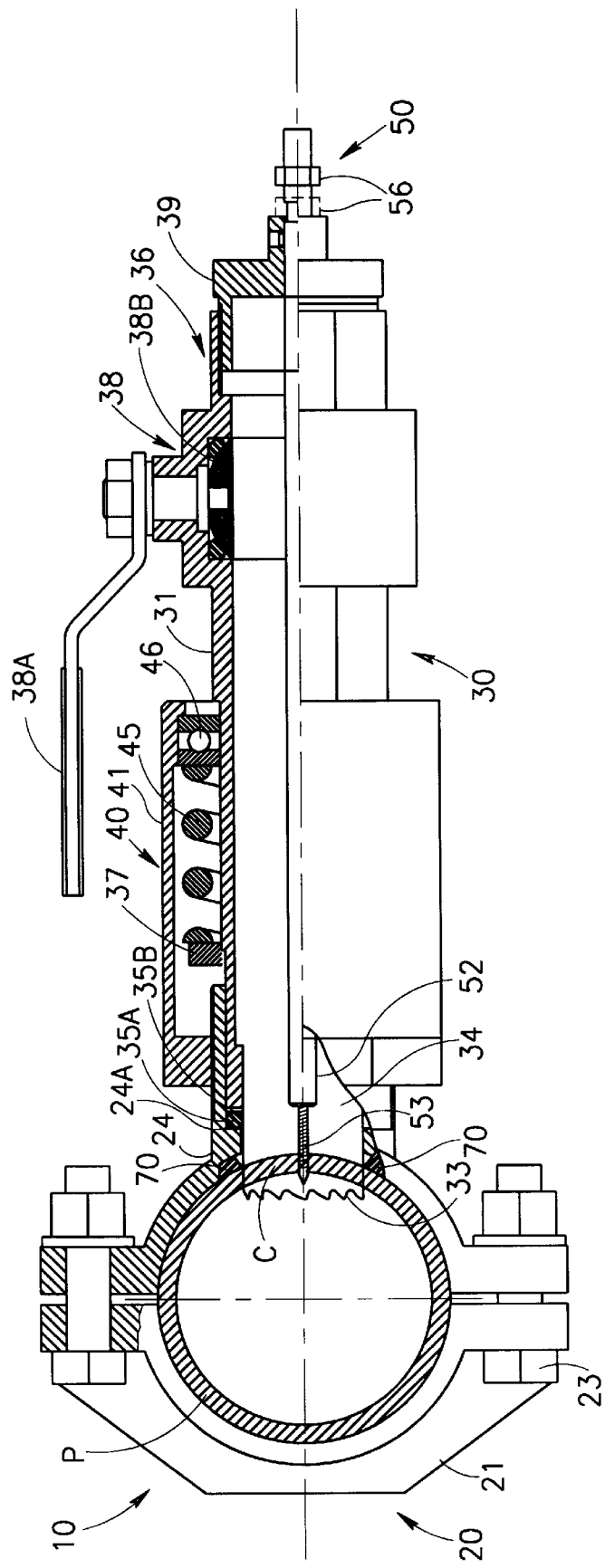
FIG. 5 is a partially cut-away side view similar to that of FIG. 4, but wherein the device's cutting edge has cut through a portion of the pipe so as to form a disc-shaped coupon for removal therefrom.
Figure 6:
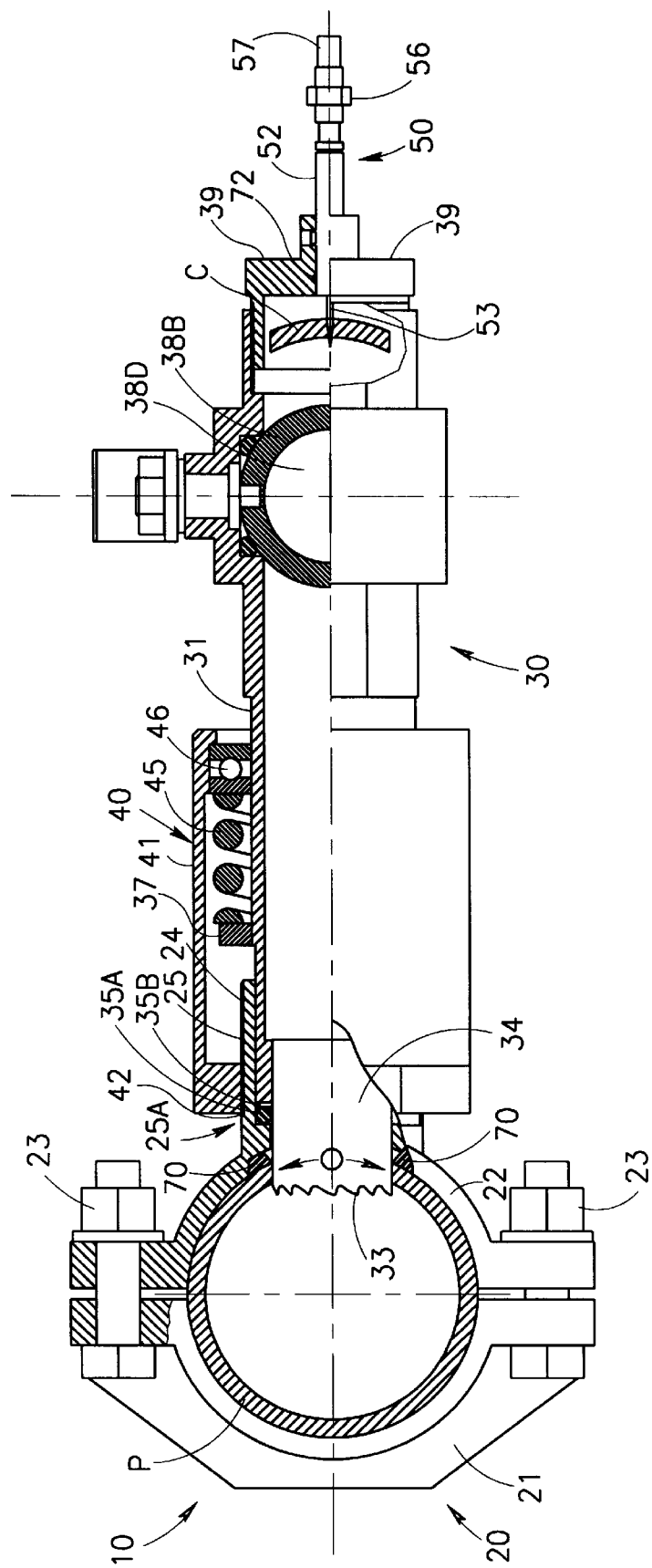
FIG. 6 is a partially cut-away side view similar to that of FIG. 5, but wherein the coupon seen in FIG. 5 has been dislodged from the pipe and moved to the exit area of the device's branch conduit, and wherein the device's valve mechanism has been closed.
Figure 7:
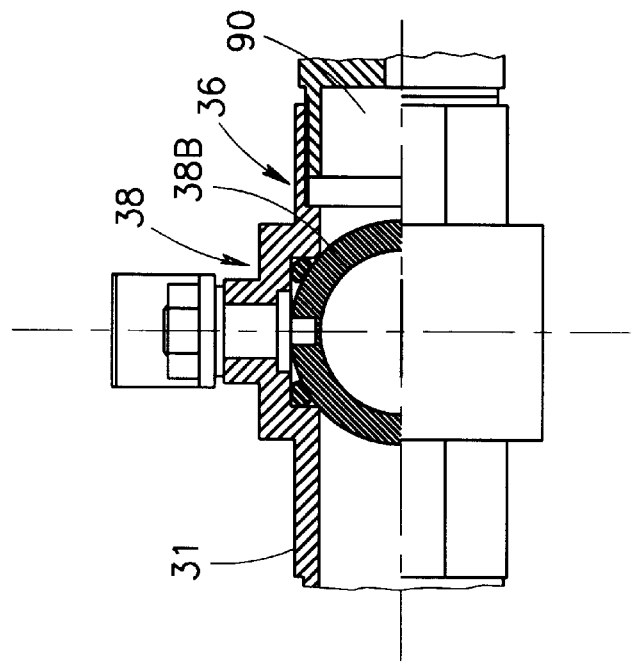
FIG. 7 is a partially cut-away side view of the outlet end of the device of FIG. 6, following removal of the coupon, gripping rod and end cap, and attachment of a branch device.

A sealing element 70 is also provided in conjunction with mounting 20, so as to prevent the escape of fluid through the interface formed between mounting portion 22 and the pipe wall, after pipe P has been tapped (FIGS. 5 and 6).

Referring still to FIG. 1, valve conduit 31 is seen to have an inlet portion 32 and an outlet portion 36. Valve conduit 31 also incorporates a support portion 37, which serves as an interface between valve 30 and compression apparatus 40. As illustrated in FIGS. 1–6, support portion 37 may take the form of an annular flange.

Also included in valve 30, is a valve mechanism 38, which is provided upstream of outlet portion 36. Valve mechanism 38 typically includes a handle 38a and a valve element 38b, and is operative to selectably close valve 30 to through-flow of a fluid as and when required. Located downstream of valve mechanism 38, is an end cap 39 which is threadedly attached to outlet portion 36 of conduit 31.

Considering now inlet portion 32 of valve conduit 31 in more detail, there is seen an annular cutting edge, referenced 33, which is operable to cut cylindrical coupon C (FIGS. 5 and 6), from pipe P. As illustrated in FIG. 1, cutting edge 33 may be provided via a separately formed cutting element 34, which is securely affixed to an end 32a of inlet portion 32 by means of welding or other suitable methods of attachment. Alternatively, cutting edge 33 may be integrally formed with inlet end 32a of valve conduit 31 (not shown) thereby obviating the need for securing a separately formed cutting element to the valve conduit.

Referring now also to FIG. 1A, there is seen a sealing element 35a and a spacer ring 35b, positioned between an inner shoulder 24a (FIG. 1) of connector 24 and inlet end 32a of valve conduit 31. Sealing element 35a is typically formed as a sealing ring, and functions to seal between conduit 31 and connector 24 when the conduit and connector are brought into full mating engagement (FIGS. 5 and 6). Spacer ring 35b is made of any suitable low-friction plastic or metal, which, when pressed into contact with inlet end 32a during operation of device 10, allows for the rotation of conduit 31 with a minimum degree of friction or resistance between itself and the conduit. Additionally, spacer ring 35b is used to limit the extent to which cutting edge 33, and associated cutting element 34 or inlet portion 32 (as the case may be), may enter pipe P upon the cutting of coupon C.

Turning now to the third main component of pipe tapping device 10, compression apparatus 40 is typically formed of a compression nut 41, which in the illustrated example, is arranged to fit over a portion of conduit 31 and to threadedly engage connector 24 by means of an inward-facing thread 42. Further, a compressive resilient element 45, shown herein as a compressive spring, is disposed within compression nut 41 between support portion 37 and an end bearing portion 46. It will be appreciated that a rotation of compression nut 41 in a direction predetermined to cause an axial translation thereof relative to connector 24, is operative to compress resilient element 45, so as to apply an axial force to support portion 37. As will be understood from the description below, such an axial force is used to assist in the attachment of gripping device 50 to pipe P. Similarly, in the preferably subsequent cutting process wherein coupon C is cut from pipe P, a similar such axial force arising from the compression of resilient element 45, is applied to support portion 37 and transferred to cutting edge 33, so as to assist in the penetration and cutting of the pipe.

Gripping device 50 preferably includes an axially extending rod 52, having an end bit 53 which has formed thereon, an external thread 54 arranged for gripping a portion of pipe to be cut, so as to enable removal thereof after cutting. As is seen in FIG. 1, rod 52 axially extends through valve conduit 31 and end cap 39 upon assembly of pipe tapping device 10. Rod 52 also has formed thereon, an end located threaded portion 52a (FIG. 1B) onto which an end nut 56 is seen to be mounted. Further, a locking element 39a such as a screw, arranged for projection into a circumferential channel 39b formed on a portion 52b of rod 52, is operative to limit an axial displacement between rod 52 and the remainder of pipe tapping device 10 (FIG. 1B). A relative rotation therebetween, is however permitted.

The operation of pipe tapping device 10 in performing the method of the invention after mounting 20 has been securely affixed to pipe P, is now described in conjunction with FIGS. 1–7.

Referring once again to FIGS. 1–1B, pipe tapping device 10 is seen to be mounted to pipe P by means of mounting 20, prior to commencement of the pipe tapping operation. As seen in FIG. 1, inlet portion 32 of valve conduit 31 is sufficiently inserted into connector 24 so that conduit 31 lies in a generally coaxial alignment with connector 24. At the same time, compression nut 41 is threadedly engaged with an end portion 24b of connector 24, allowing resilient element 45 to remain generally uncompressed. Meanwhile, rod 52, is movably positioned with respect to pipe P, such that the tip 55 of end bit 53 rests in touching contact with pipe P.

Locking element 39a is then projected into channel 39b as described above in conjunction with FIG. 1B, such that in accordance with a preferred embodiment of the invention, cutting edge 33 is maintained at a predetermined minimum distance, d, from the closest point of tangential contact with pipe P. For reasons which will be understood from the description below, this minimum distance d, is preferably equal to, or greater than, the thickness of the pipe wall.

Following the positioning of rod 52 and arrangement of locking element 39a, compression nut 41 is further threadedly rotated along connector 24 (FIG. 2), thereby compressing resilient element 45 between support portion 37 and end bearing portion 46, so as to apply an axial force to support portion 37. Since rod 52 is connected to support portion 37 via valve conduit 31, end cap 39 and locking element 39a, the compression of resilient element 45 will have the consequential effect of transferring an axial force to end bit 53 at the point of contact with pipe P. As described hereinbelow, this axial force assists in the threaded insertion of end bit 53 into pipe P.

Following compression of resilient element 45 (FIG. 2), rod 52 is rotated in a predetermined direction, x (FIG. 3), so as to correspond with the direction of thread 54 formed upon end bit 53. Rod 52 is rotated via an end 57 thereof, preferably with a suitable spanner or the like (not shown). Under the axial force exerted upon end bit 53 by compressed resilient element 45, and the rotational force which arises from the turning of rod 52, end bit 53 begins to threadably penetrate pipe P. At the same time, cutting edge 33—which is connected to rod 52 via conduit 31, end cap 39 and locking element 39a—moves closer towards pipe P as a consequence of end bit 53 penetrating the pipe.

In accordance with performing the method of the invention using a preferred embodiment of the invention as described above, rod 52 is rotated until such time as end bit 53, penetrates through the pipe wall of pipe P, and cutting edge 33 comes into touching contact with pipe P. Following this process, locking element 39a is withdrawn from channel 39b (FIG. 3A), so that conduit 31 becomes functionally disconnected from rod 52 of gripping device 50.

It will be appreciated from the above description, that as valve conduit 31 and cutting edge 33 draw closer towards pipe P upon end bit 53 threadably penetrating the pipe, resilient element 45 becomes gradually decompressed. Thus, in accordance with the method of the invention, compression nut 41 is once again rotated along connector 24 (FIG. 4) in a manner similar to that described above, so as to compress resilient element 45 once more and thus apply a further axial force to support portion 37. As previously noted, this axial force is intended to aid in the cutting of coupon C from pipe P as is described hereinbelow.

Following the above-mentioned further rotation of compression nut 41, valve 30 is then rotated as depicted in FIG. 5, so that cutting edge 33 engages pipe P in a radial cutting motion, thereby creating a rotational frictional force between the cutting edge and a corresponding circular portion of the pipe. Such rotation of valve 30 may be achieved for example, by manually grasping and turning end cap 39 together with outlet portion 36 of conduit 31. Under the axial force applied to support portion 37 and transferred to cutting edge 33 via conduit 31, this rotation of valve 30 causes cutting edge 33 to penetrate a portion of pipe P.

In accordance with the method of the invention, valve 30 is continued to be rotated until such time as cutting edge 33 completely penetrates the pipe wall so as to form a disc-shaped coupon C as illustrated. In a preferred embodiment of the invention, the conclusion of this cutting process is indicated when sealing element 35a becomes tightly compressed between spacer ring 35b and inner shoulder 24a of connector 24. As is also illustrated in FIG. 5, coupon C is held in place by end bit 53 of rod 52 after having been cut from pipe P.

As will be appreciated by persons skilled in the art, the above-described cutting process will be enhanced, where a strong axial force, applied at the point of contact between cutting edge 33 and pipe P, is maintained. Thus, in accordance with an alternative method of the invention, compression nut 41 and valve 30 are alternately rotated so as to periodically compensate for the gradual decompression of resilient element 45 which occurs as cutting edge 33 enters pipe P.

Referring now also to FIG. 6, compression nut 41 is threadedly rotated along connector 24 in accordance with the method of the invention, until resilient element 45 becomes completely compressed. In a preferred embodiment of the invention, the completion of this compression process may be indicated when the compression nut's inward facing thread 42 reaches an end 25a of thread 25 as depicted in FIG. 6. The resulting compression of resilient element 45, assists in reinforcing the axial sealing force applied to sealing element 35a via support portion 37, conduit 31 and spacer ring 35b.

Thereafter, end nut 56 is threadedly rotated along the end located threaded portion 52a (FIG. 1A) of rod 52, until it comes into pressing contact with an adjacent end 39c of end cap 39 (FIG. 5). Subsequent rotation of end nut 56 will then be operative to translate rod 52, end bit 53 and the threadedly attached coupon C, in an axial direction away from pipe P, thereby dislodging the coupon from the inner recess of cutting edge 33. Once coupon C has been sufficiently dislodged from cutting edge 33, it may easily be drawn through conduit 31 and a sufficiently sized opening 38d in valve element 38b, by means of translating rod 52 with the aid of end 57 thereof (FIG. 6). A sealing element 72—which is preferably formed as an annular seal affixed between rod 52 and end cap 39 (FIGS. 1B, 3A, and 6)—prevents the escape of gaseous or liquid material which enters conduit 31 as the coupon is being withdrawn from pipe P to outlet portion 36.

Once rod 52 and attached coupon C have been moved through conduit 31 and valve mechanism 38, the valve mechanism is set in a closed position (FIG. 6) with the aid of handle 38a (FIG. 5), so that valve member 38b is pivoted so as to block the passage of any fluid (not seen) which flows from pipe P into conduit 31.

Thereafter, end cap 39 with attached rod 52, end bit 53 and coupon C, are removed, and sealingly replaced with an ancillary device or branch pipe, referenced 90 (FIG. 7), whereupon valve mechanism 38 may then be reopened to allow for through-flow of fluid from pipe P to ancillary device or branch pipe 90, via conduit 31.

Alternatively, end cap 39 with attached rod 52, end bit 53 and coupon C, may be removed and sealingly replaced with a removable sealing cap (not shown), until such time as an additional device or branch pipe is required to be installed.

It will readily be appreciated from the above description and the illustrations provided in FIGS. 5 and 6, that once cylindrical cutting edge 33 has been operative to cut a portion of pipe P, the cutting edge and associated cutting element 34 or inlet portion 32 (as the case may be), will remain within the opening, O, formed in the pipe wall of pipe P (FIG. 6), even after coupon C is removed from the pipe wall area. Thus it will be appreciated by persons skilled in the art, that the mating engagement between cutting edge 33 and a portion of pipe P, provides a significant degree of stabilization around the area of engagement, thereby preventing the newly joined valve from being accidentally moved out of alignment with the opening formed in pipe P.

Figure 8:
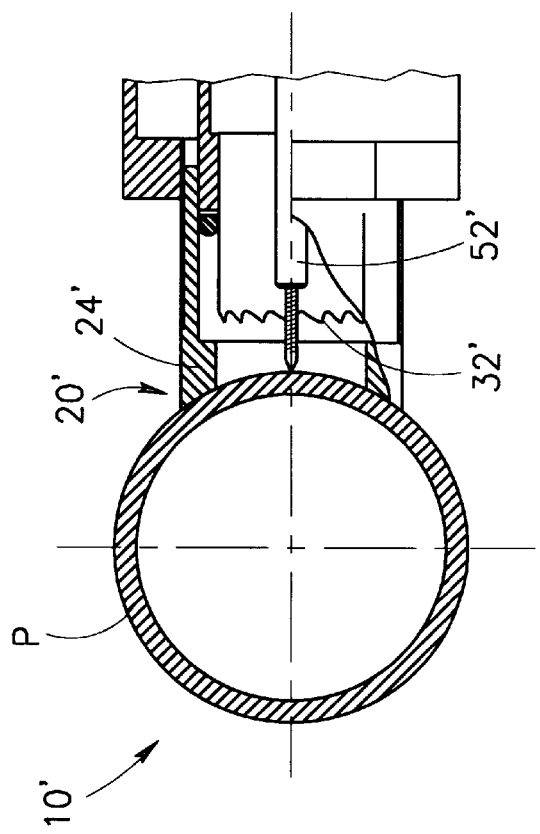
FIG. 8 is a partially cut-away side view of the inlet end of a pipe tapping device constructed in accordance with a first alternative embodiment of the present invention, wherein the device's mounting is configured for attachment to a pipeline through welding means.

It will also readily be appreciated by persons skilled in the art, that alternative embodiments of the invention are envisaged, and which, although not described in detail herein, are intended to be covered by the above description. By way of non-limiting example only, FIG. 8 illustrates a first alternative embodiment of the invention, referenced generally 10', wherein mounting 20' is simply formed as a connector 24' (i.e. without additional mounting portions) and is arranged for connection to a pipe P, by means of welding.

Figure 9:
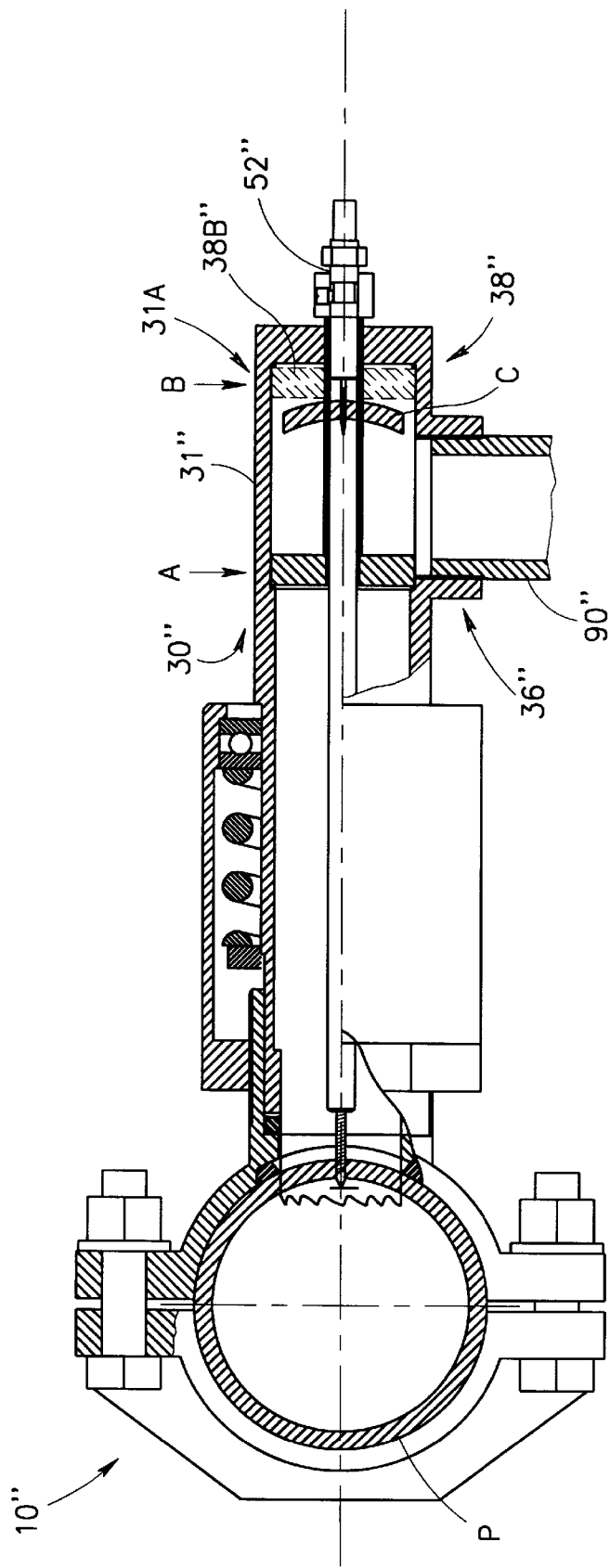
FIG. 9 is a partially cut-away side view of a pipe tapping device constructed in accordance with a second alternative embodiment of the present invention and connected to a pipe, wherein the device incorporates a valve mechanism which may be selectably opened and closed by means of a linearly translatable valve element.

Similarly, FIG. 9 illustrates a pipe tapping device, referenced generally 10", constructed and arranged in accordance with a second alternative embodiment of the invention, and attached to a pipe P. The construction and operation of device 10" is generally similar to that of device 10 described hereinabove, however an alternative valve mechanism 38" is provided so as to help reduce the production costs incurred in making the device. In contrast to the pivotable ball valve mechanism 38 incorporated in device 10 described above (FIGS. 1–7), valve mechanism 38" employs a valve element 38b" which is linearly translated from a first position, referenced A, to a second position, referenced B, so as to open valve 30" to through-flow of a fluid (not shown).

In accordance with the method of the invention used to operate device 10", a cut coupon C is withdrawn to an extreme end 31a of conduit 31", along with valve element 38b", so as to allow for through-flow of a liquid from the tapped pipe P to a branch pipe referenced 90", via outlet portion 36" of valve 30". As seen in FIG. 9, outlet portion 36" is transversely arranged with respect to the remainder of valve conduit 31".

Further, although the gripped coupon C remains housed within end 31a of valve 30", the majority portion of rod 52" which has been withdrawn from the remainder of device 10", may be detached from the portion of rod remaining within the device at a rod joint (not seen) provided for this purpose.

Thus, it will be appreciated by persons skilled in the art that the scope of the present invention is not limited by what has been illustrated and described hereinabove, merely by way of example. Rather, the scope of the present invention is limited solely by the claims which follow.

I claim:

1. A pipe tapping device including:
    a valve conduit having a longitudinal axis, a fluid inlet portion and a fluid outlet portion, wherein said fluid inlet portion has associated therewith, a cutting edge;
    a mounting apparatus for mounting said valve conduit onto a pipe to be tapped; and
    a compression apparatus coupled to said mounting apparatus, the compression apparatus including a rotatable compression element mounted for rotation about said valve conduit, wherein rotation of the rotatable compression element brings said cutting edge into compressive contact with an outer surface of the pipe prior to tapping of the pipe;
    wherein said valve conduit is selectably rotatable relative to said compression apparatus and about said longitudinal axis, such that upon bringing said cutting edge into said compressive contact with an outer surface of the pipe by rotation of said compression apparatus, rotation of said valve conduit is operative to transfer a turning force to said cutting edge so as to cause said cutting edge to cut a preselected portion of the pipe wall, thereby to a coupon to be retained within said cutting edge.

2. A pipe tapping device according to claim 1, wherein said compression element is mounted onto at least a portion of said mounting apparatus extending transversely to the pipe wall, and arranged for selectable rotation about said portion of said mounting apparatus so as to axially translate therealong when rotated.

3. A pipe tapping device according to claim 1, wherein said compression apparatus includes a compressive resilient element, arranged between said compression element and a predetermined support portion of said valve conduit, and wherein said compression element is operable to be rotated in a predetermined direction about said longitudinal axis so as to compress said resilient element.

4. A pipe tapping device according to claim 3, wherein compression of said resilient element causes transfer of an axial force to said cutting edge via said support portion of said valve conduit, so as to cause said cutting edge to bear on the pipe wall.

5. A pipe tapping device according to claim 1, further including a a gripping device having a gripping rod axially extending through said valve conduit.

6. A pipe tapping device according to claim 5, wherein said gripping rod is selectably rotatable and includes an end bit for threaded engagement with the preselected portion of the pipe wall from which the coupon is to be formed.

7. A pipe tapping device according to claim 6, wherein said gripping device and said compression apparatus cooperate to bring said end bit into compressive contact with an outer surface of the pipe.

8. A pipe tapping device according to claim 7, and including apparatus for transferring a force from said compression apparatus to said gripping device so as to cause said end bit to bear on the pipe wall.

9. A pipe tapping device according to claim 8, wherein said gripping rod is selectably rotatable so as to transfer a turning force to said end bit thereby to cause said end bit to threadedly engage the preselected portion of the pipe wall.

10. A pipe tapping device according to claim 8, further including a valve apparatus for selectively closing said fluid outlet portion to through-flow, wherein said gripping rod is operable to grip said coupon, and wherein said gripping rod is selectively removable through said valve conduit, with the coupon secured thereto, when said fluid outlet portion is closed to through-flow by said valve apparatus.

11. A pipe tapping device according to claim 10, wherein said apparatus for selectably closing said fluid outlet portion to through-flow includes a valve mechanism.

12. A pipe tapping device according to claim 1, wherein said cutting edge is a circular cutting edge.

13. A pipe tapping device according to claim 1, wherein said cutting edge is integrally formed with said fluid inlet portion.

14. A pipe tapping device according to claim 1, wherein said mounting apparatus includes a cylindrical connector oriented generally transverse to the pipe.

15. A pipe tapping device according to claim 14, and wherein said connector has integrally formed therewith at least one additional mounting portion arranged for attachment around at least a portion of the pipe.

16. A pipe tapping device according to claim 15, and including at least one fastening element for fastening said at least one additional mounting portion around the portion of the pipe.

17. A pipe tapping device according to claim 14, and wherein said connector is welded to the pipe.

18. A pipe tapping device according to claim 1, and also including at least one sealing element for sealing between said fluid inlet portion of said valve conduit and said mounting apparatus.

19. A pipe tapping device according to claim 1, and also including at least one sealing element for sealing between said mounting apparatus and the pipe.

20. A pipe tapping device according to claim 1, and including at least one sealing element for sealing said fluid outlet portion of said valve conduit.

21. A pipe tapping device according to claim 1, wherein said outlet portion of said valve conduit is configured for attachment of a branch member thereto.

22. A pipe tapping device according to claim 1, further including a valve apparatus for selectively closing said fluid outlet portion to through-flow.

23. A method of tapping a pipe including the steps of:
  (a) mounting onto a pipe to be tapped a valve conduit having a longitudinal axis, a fluid inlet, a fluid outlet, and a cutting edge associated with the inlet, wherein the cutting edge is arranged adjacent to the pipe;
  (b) rotating a compression apparatus about said valve conduit so as to cause the cutting edge to bear onto a portion of a wall of the pipe sought to be tapped; and
  (c) then rotating at least the valve conduit relative to said compression apparatus and about the longitudinal axis, so as to cause a rotation of the cutting edge relative to the pipe, thereby causing the cutting edge to cut through the pipe wall so as to define a coupon to be retained within said cutting edge.

24. A method of tapping a pipe according to claim 23, wherein step (c) includes the substeps of gripping the portion of the pipe wall from which the coupon is to be cut from and closing the fluid outlet to flow-through of fluid by a valve apparatus; and
  further including the step of (d) removing the coupon from the pipe.

25. A method of tapping a pipe according to claim 24, wherein step d further includes the step of extracting the coupon through the valve conduit and valve apparatus.

26. A method of tapping a pipe according to claim 23, wherein said steps of rotating a compression apparatus and rotating at least the valve conduit about the longitudinal axis, are alternatingly repeated until the cutting edge cuts through the entire thickness of the pipe wall.

27. A method of tapping a pipe according to claim 24, wherein said step of gripping includes the following sub-steps:
  positioning a threaded gripping element adjacent to the portion of the pipe wall from which the coupon is formed;
  compressing the compressive resilient element so as to cause the threaded gripping element to bear onto the portion of pipe wall; and
  rotating the threaded gripping element thereby causing the threaded gripping element to threadedly engage the portion of the pipe wall.

28. A method of tapping a pipe according to claim 27, wherein the said sub-steps of compressing the compressive resilient element and rotating the threaded gripping element, are alternatingly repeated until such time as the threaded gripping element engages the portion of the pipe wall to at least a desired depth.

29. A method of tapping a pipe according to claim 23, and also including the step of closing the fluid outlet to through-flow of fluid prior to cutting through the pipe wall.

* * * * *

UNITED STATES PATENT AND TRADEMARK OFFICE
CERTIFICATE OF CORRECTION

PATENT NO. : 5,964,240
DATED : October 12, 1999
INVENTOR(S) : Yuri GRANOVSKI

It is certified that error appears in the above-identified patent and that said Letters Patent is hereby corrected as shown below: On the title page:

After "[22] Filed: Sep. 11, 1998", insert
--[30] Foreign Application Priority Data:
    June 15, 1998 [IL] Israel ......................124919--

Signed and Sealed this

Eighteenth Day of April, 2000

*Attest:*

Q. TODD DICKINSON

*Attesting Officer*      *Director of Patents and Trademarks*